(12) United States Patent
Xiao et al.

(10) Patent No.: US 9,787,344 B2
(45) Date of Patent: Oct. 10, 2017

(54) RADIATION ALLEVIATION

(71) Applicants: Empire Technology Development, LLC, Wilmington, DE (US); Yue Xiao, Sichuan (CN); Jun Fang, Shaanxi (CN)

(72) Inventors: Yue Xiao, Sichuan (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/785,882

(22) PCT Filed: May 13, 2014

(86) PCT No.: PCT/CN2014/077323
§ 371 (c)(1),
(2) Date: Oct. 21, 2015

(87) PCT Pub. No.: WO2015/172308
PCT Pub. Date: Nov. 19, 2015

(65) Prior Publication Data
US 2016/0164564 A1    Jun. 9, 2016

(51) Int. Cl.
*H04W 52/18* (2009.01)
*H04B 1/3827* (2015.01)

(52) U.S. Cl.
CPC .......... *H04B 1/3838* (2013.01); *H04W 52/18* (2013.01); *H04B 2001/3844* (2013.01)

(58) Field of Classification Search
CPC ......... H04B 2001/3844; H04B 1/3838; H04W 52/18

USPC .......................... 455/425, 522, 550.1, 575.5
See application file for complete search history.

(56) References Cited

U.S. PATENT DOCUMENTS

| | | | |
|---|---|---|---|
| 7,302,009 | B2 | 11/2007 | Walton et al. |
| 8,621,251 | B1 | 12/2013 | Keller et al. |
| 2005/0266874 | A1 | 12/2005 | Lai et al. |
| 2007/0291635 | A1 | 12/2007 | Yang et al. |

(Continued)

FOREIGN PATENT DOCUMENTS

| | | |
|---|---|---|
| CN | 101489294 A | 7/2009 |
| CN | 101772206 A | 7/2010 |

(Continued)

OTHER PUBLICATIONS

"iPhone 5 RF Exposure Information," Accessed at https://web.archive.org/web/20140506150351/http://www.apple.com/legal/rfexposure/iphone5,1/en/, Accessed on Sep. 4, 2015, pp. 2.

(Continued)

*Primary Examiner* — Sam Bhattacharya
(74) *Attorney, Agent, or Firm* — Brundidge & Stanger, P.C.

(57) ABSTRACT

In some examples, a mobile device includes a radiation sensor configured to measure an amount of radiation surrounding a corresponding device that is communicatively connected to a second device and/or a third device, a comparator configured to compare the measured amount of radiation to a predetermined radiation threshold, a wireless communication manager configured to report to the second device and/or the third device a result output from the comparison module, and a collaboration manager configured to collaborate with the second device.

20 Claims, 5 Drawing Sheets

(56) References Cited

U.S. PATENT DOCUMENTS

| | | | | |
|---|---|---|---|---|
| 2011/0117973 | A1* | 5/2011 | Asrani | H04W 52/245 455/571 |
| 2012/0171963 | A1 | 7/2012 | Tsfaty | |
| 2012/0258672 | A1 | 10/2012 | Hochwald | |
| 2012/0309382 | A1 | 12/2012 | Dugan | |

FOREIGN PATENT DOCUMENTS

| | | |
|---|---|---|
| CN | 103685740 A | 3/2014 |
| WO | 2007146561 A2 | 12/2007 |

OTHER PUBLICATIONS

Alamouti, S.M., "A simple transmit diversity technique for wireless communications," IEEE Journal on Selected Areas in Communications, vol. 16, Issue 8, pp. 1451-1458 (Oct. 1998).

Dohler, M., et al., "A resource allocation strategy for distributed MIMO multi-hop communication systems," IEEE Communications Letters, vol. 8, Issue 2, pp. 99-101 (Feb. 2004).

Hochwald, B., and Fay, P., "Multiple Transmitter Chains to Minimize Exposure in Portable Devices," National Science Foundation, pp. 1 (Aug. 2011-Jul. 2012).

Hochwald, B.M., and Love, D.J., "Minimizing Exposure to Electromagnetic Radiation in Portable Devices," Information Theory and Applications Workshop (ITA), pp. 255-261 (Feb. 5-10, 2012).

International Search Report and Written Opinion for International Patent Application No. PCT/CN2014/077323 mailed Feb. 15, 2015.

Maeda, N., et al., "Variable spreading factor-OFCDM with two dimensional spreading that prioritizes time domain spreading for forward link broadband wireless access," IEICE transactions on communications, vol. E88-B, Issue 2, pp. 487-498 (Feb. 1, 2005).

Pabst, R., et al., "Relay-based deployment concepts for wireless and mobile broadband radio," IEEE Communications Magazine, vol. 42, Issue 9, pp. 80-89 (Sep. 2004).

Priyanto, B.E., "Initial performance evaluation of DFT-spread OFDM based SC-FDMA for UTRA LTE uplink," IEEE 65th Vehicular Technology Conference, 2007. VTC2007-Spring, pp. 3175-3179 (Apr. 22-25, 2007).

Repacholi, M.H., "Health risks from the use of mobile phones," Toxicology Letters, vol. 120, Issues 1-3, pp. 323-331 (Mar. 31, 2001).

Setiawan, A., "lightRadio™: Evolve your wireless broadband network for the new generation of applications and users," pp. 1-3 (Jun. 13, 2011).

Shannon, C E., "A mathematical theory of communication," ACM SIGMOBILE Mobile Computing and Communications Review, vol. 5, Issue 1, pp. 3-55 (Jan. 2001).

Tarokh, V., et al., "Space-time block codes from orthogonal designs," IEEE Transactions on Information Theory, vol. 45, Issue 5, pp. 1456-1467 (Jul. 1999).

Yee, N., et al., "Multi-carrier CDMA in indoor wireless radio networks," IEICE Transactions on Communications, vol. E77-B, No. 7 pp. 109-114 (1993).

Yuan, G., et al. "Carrier aggregation for LTE-advanced mobile communication systems," IEEE Communications Magazine, vol. 48, Issue 2, pp. 88-93 (Feb. 2010).

Zhou, S., et al ., "Distributed Wireless Communication System: A New Architecture for Future Public Wireless Access," IEEE Communications Magazine, vol. 41, Issue 3, pp. 108-113 (Mar. 2003).

Zhou, Y, et al., "OFCDM: a promising broadband wireless access technique," IEEE Communications Magazine, IEEE, vol. 46, Issue 3, pp. 38-49 (Mar. 2008).

\* cited by examiner

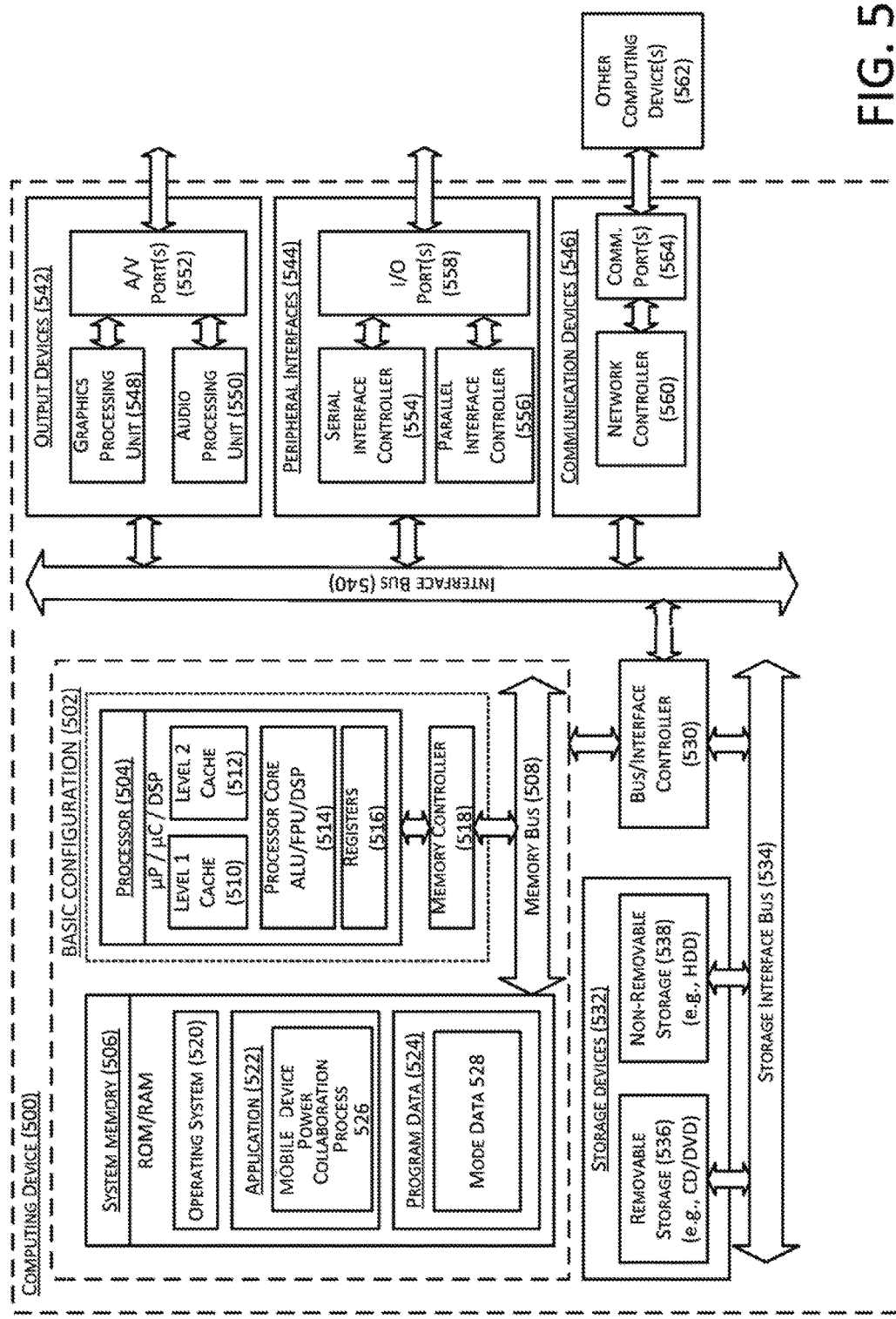

RADIATION ALLEVIATION

CROSS-REFERENCE TO RELATED APPLICATION

This Application is the U.S. National Stage filing under 35 U.S.C. §371 of International Application Ser. No. PCT/CN2014/077323 filed on May 13, 2014. The disclosure of the PCT Application is hereby incorporated herein by reference in its entirety.

TECHNICAL FIELD

The technologies described herein pertain generally to reducing radiation surrounding a device.

BACKGROUND

Unless otherwise indicated herein, the approaches described in this section are not prior art to the claims in this application and are not admitted to be prior art by inclusion in this section.

Mobile devices are ubiquitous, facilitating voice, video, and data transmission and reception for respective users. Examples of mobile devices carried by a user may include, but are not limited to, remote medical treatment devices, distributed wearable antennas and devices, body implanted devices, and smartphones, all of which may contribute to increased radiation surrounding a respective user.

SUMMARY

Technologies are generally described for reducing radiation surrounding a user of a mobile device through mobile device collaboration and radiation alleviation. The various techniques may be implemented in various devices, methods, computer-readable mediums having executable instructions stored thereon, and/or systems.

In some examples, various embodiments may be implemented as methods. Some methods may include: measuring, at least once within a predetermined period of time, an amount of radiation surrounding a first device that is communicatively coupled to a second device; comparing the measured amount of radiation to a predetermined radiation threshold for the predetermined amount of time; and in response to the measured amount of radiation being greater than or equal to the predetermined radiation threshold, reporting, to the second device, the measured amount of radiation, and collaborating with the second device to reduce the amount of radiation surrounding the first device. In some examples, various embodiments may be implemented as a non-transitory, tangible, computer or machine readable medium having executable instructions stored thereon. The executable instructions, when executed, may cause one or more processors to perform operations including: measuring an amount of radiation emitted from a plurality of other devices surrounding a first device; comparing the measured amount of radiation to a predetermined radiation threshold; and in response to the measured amount of radiation being greater than or equal to the predetermined threshold, reporting, to the plurality of other devices, the measured amount of radiation, and dividing the plurality of other devices into pairs of devices to respectively collaborate with each other to reduce the amount of radiation surrounding the first device.

In some examples, various embodiments may be implemented as an apparatus that may include: a radiation sensor configured to measure an amount of radiation surrounding a corresponding device that is communicatively connected to a second device; a comparator configured to compare the measured amount of radiation to a predetermined radiation threshold; a wireless communication manager configured to report to the second device the measured amount of radiation from the comparison module; and a collaboration manager configured to collaborate with the second device to reduce the amount of radiation surrounding the corresponding device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings:

FIG. 5 shows a block diagram illustrating an example computing device by which various example solutions described herein may be implemented, arranged in accordance with at least some embodiments described herein.

DETAILED DESCRIPTION

Figure 1:
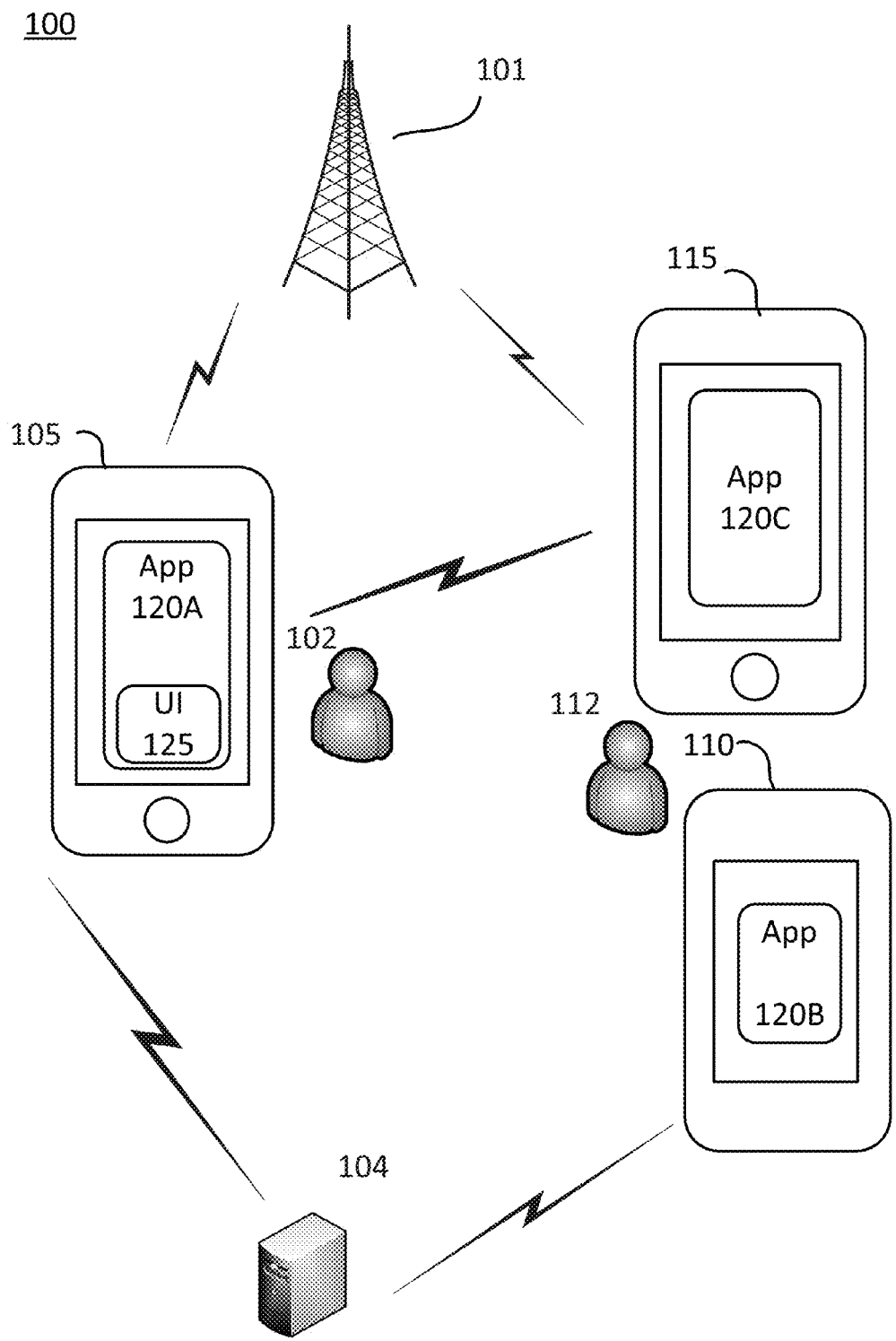
FIG. 1 shows an example system in which radiation levels may be alleviated by collaboration between multiple devices, arranged in accordance with at least some embodiments described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In accordance with some examples of radiation alleviation, a device operated or otherwise under the control of a user may serve to reduce radiation levels to which the user is exposed. As a non-limiting example, a coffee shop patron may have both her tablet computer and smartphone by her side, and surrounding other patrons may possess one or more similar devices. One of the user's devices, hosting an instance of an application to alleviate radiation, may be configured to measure radiation levels continuously, multiple times, or at least one time within the predetermined period of time, in close proximity to the user. Responsive to the measured radiation levels that are equal to or greater than a threshold radiation level, the user's device may instruct one or more of the surrounding devices, also hosting an instance of the aforementioned application, to reduce levels of emitted radiation by changing communication modes for the respective devices over a predetermined period of time or until the measured radiation level is less than the threshold radiation level.

FIG. 1 shows an example system 100 arranged in accordance with at least some embodiments described herein and implements radiation alleviation. As depicted, system 100 includes, at least, a first device 105 that may be used, operated, or otherwise possessed by a user 102; and a second device 110 and a third device 115 that may be used, operated, or otherwise possessed by a second user 112. Further, as depicted, the first device 105 may host an instance 120A of an application that may be configured to alleviate radiation; the second device 110 may also host an instance 120B of the application to alleviate radiation; and the third device 115 may also host an instance 120C of the application to alleviate radiation.

The first device 105, the second device 110, and the third device 115 may respectively refer to handheld cellular telephones, e.g., smartphones, but may also refer to any wireless device that may host respective instances of an application configured to alleviate radiation. Each of first device 105, second device 110, and third device 115 may implement one or more of multiple wireless communication techniques including Orthogonal Frequency Division Multiplexed (OFDM); Long Term Evolution (LTE), Long Term Evolution Advanced (LTE-A); Code Division Multiple Access (CDMA); Global System for Mobile communications (GSM); $3^{rd}$ generation (3G) mobile telecommunications technologies; $4^{th}$ generation (4G) mobile telecommunications technologies; Wireless Broadband Internet (WiBro); Mobile Worldwide Interoperability for Microwave Access (WiMAX); High Speed Downlink Packet Access (HSDPA); and the like, in accordance with at least some of the embodiments described herein. Other non-limiting examples for at least one of first device 105, second device 110, and third device 115 may include personal digital assistant (PDA); a tablet computer; a laptop computer; a portable communication device; a wearable computing device including, for example, Google Glass® of Google® Inc.; Samsung Galaxy Gear® Smart Watch; Pebble® Smart Watch, Fitbit® Wireless Activity Tracker; and equivalents thereof.

In some example embodiments, other physical signal formats may be used to alleviate radiation to offer a trade-off between radiation, transmission speed, and performance including: Time-domain CDMA and Frequency-Time domain CDMA which may be combined to reduce the amount of radiation transmitted; multi-antenna transmission techniques including spatial spreading and Space-Time Block Code (STBC); and a carrier aggregation scheme in LTE which offers similar performance to OFDM-CDMA. STBC may be able to replace OFDM-CDMA and offer similar spreading gain to reduce and/or alleviate radiation.

It will be appreciated that the nomenclature for such communication modes may vary without departing from the scope of the embodiments described herein. Further, although examples provided herein pertain to changing a communication mode of a device, embodiments described herein may be implemented by applications by which a communication mode is changed based at least in part on one or more conditions, e.g., measured radiation exceeding a predetermined radiation threshold level, passage of a predetermined period of time, etc.

In some example embodiments, the first device 105 may be configured to measure and/or detect, directly or indirectly, an amount of radiation emitted by second device 110 and/or third device 115 that may be proximately located relative to each other, whereby the first device 105, the second device 110, and the third device 115 may be communicatively connected to each other. Further, the proximate location of the first device 105, to the second device 110 and the third device 115 may be such that the emitted radiation from the second device 110 and the third device 115 is detectable or measurable by the first device 105. In some example embodiments, a predetermined period of time during which the first device 105 may measure the radiation emitted by one or both of the second device 110 and the third device 115 may start from when the first device 105 is proximately located to at least one of the second device 110, and/or the third device 115 or when the first device 105 initially detects a measurable amount of radiation from the second device 110 and/or the third device 115. In other example embodiments, the predetermined period of time may be measured from when the first device 105 is communicatively connected to at least one of the second device 110, and/or third device 115 via the instances of the applications installed on the respective devices. First device 105 may be further configured to compare the measured amount of radiation emitted from the second device 110 and third device 115, either singularly or in aggregate, to an acceptable predetermined radiation threshold level value stored in a memory of first device 105.

In some example embodiments, the first application 120A may refer to an instance of an application hosted on the first device 105 that may be configured, designed, and/or programmed to facilitate a change of communication mode which changes a radiation amount of the communication, for the first device 105. The first application 120A may include a user interface (UI) 125 that enables the user 102 to select communication modes including, but not limited to, normal and/or low radiation transmission modes. The UI 125 may further enable the user 102 to enter an acceptable predetermined radiation threshold level for the first device 105. The UI 125 may further still enable the user 102 to define conditions of when the radiation alleviation is to be implemented. The user-defined conditions may include, but are not limited to, the acceptable predetermined radiation threshold level, an acceptable predetermined period of time, and an acceptable threshold number of times for the measured amount of radiation to be greater than or equal to, or alternatively, be less than the predetermined radiation threshold during the predetermined period of time before implementing the radiation alleviation process. Further, the second application 120B and third application 120C may refer to an instance of an application hosted on the second device 110 and third device 115, respectively that is similar to, if not the same, as the instance of the application hosted on first device 105.

In some example embodiments, the first application 120A operating on the first device 105 may be further, or alternatively, configured, designed, and/or programmed to receive a communication indicating an amount of radiation emitted from the second device 110 and/or the third device 115 that is greater than or equal to the predetermined radiation threshold level during the predetermined period of time by communicating, directly or indirectly, with the second device 110 and/or the third device 115, which hosts the second application 120B and the third application 120C, respectively. For example, the first application 120A may detect a short-range communication between at least one of the first device 105, the second device 110, and the third device 115 including, e.g., Bluetooth, radio-frequency identification (RFID), Wi-Fi, infrared and near field communication (NFC). Further, alternatively or in addition, the first application 120A may detect indirect communication between the first device 105, the second device 110, and the third device 115 including, e.g., long-range communication via at least one of wireless communication base station 101 and server 104. Based on the aforementioned configurations, designs, and/or programming of the first application 120A, the first device 105 may determine an amount of radiation surrounding the first device 105 of the first user 102.

In some example embodiments, the first device 105 may be configured detect multiple communicatively coupled devices (110, 115) operating instances of the applications (120B, 120C). For the pair of devices 110 and 115, the first device 105 may provide instructions for multiplex processing by the pair of devices 110 and 115 to alternate between communication modes of a normal radiation transmission mode and a low radiation transmission mode. The pair of devices 110 and 115 may alternate communication modes such that, while the second device 110 may transmit in a normal radiation transmission mode, the third device 115 is configured to transmit in a low radiation transmission mode. The total emitted radiation utilizing this multiplex processing at any point in time may be an average of the radiation emitted during the normal and low radiation transmission modes at the point in time.

In some example embodiments, for each pair of devices 110 and 115, the first device 105 may provide instructions for multiplex processing by the pair of devices 110 and 115 to alternate communication modes such that both the second device 110 and the third device 115 may transmit in a normal radiation transmission mode, then both the second device 110 and the third device 115 may change to a low radiation transmission mode, or vice versa. Therefore, the total emitted radiation over a cycle of the normal and low radiation transmission modes may be an average of the radiation emitted over the cycle during the normal and low radiation transmission modes.

In some example embodiments, responsive to the first device 105 determining that a measured or detected amount of radiation of the second device 110 and/or the third device 115 is greater than or equal to the predetermined radiation threshold level during the predetermined period of time, the first device 105 may change its communication mode from the normal radiation transmission mode to a low radiation transmission mode.

In some example embodiments, responsive to the first device 105 determining that a measured or detected amount of radiation of the second device 110 and/or the third device 115 is less than the predetermined radiation threshold level during the predetermined period of time, the first device 105 may change its communication mode from the low radiation transmission mode to a normal radiation transmission mode.

In some example embodiments, a visual or audible indication of the measured amount of radiation is greater than or equal to the predetermined radiation threshold is provided by the first device 105.

In some example embodiments, the instance of application 120A operating on the first device 105 may be further configured, designed, and/or programmed to receive input from first user 102 to operate passively or actively. For example, in a passive state, the first device 105 may change from an initial communication mode to another communication mode upon passively receiving indication of an amount of radiation emitted from the second device 110 and/or the third device 115. Alternatively or in addition, in an active state, the first device 105 may actively detect and measure an amount of radiation surrounding the first device 105. In some embodiments of the active state, a frequency at which the first device 105 actively detects and measures an amount of radiation surrounding the first device 105 may be customized by the user 102. For example, the first device 105 may be configured to actively detect, measure, and/or probe an amount of radiation surrounding the first device 105 every second, several seconds, minute, every several minutes, every hour, and so on. The user 102 may vary the active detection and measurement settings to save battery life, that is, to conserve battery life, the user 102 may set the active detection setting for longer period of times, or to set the detection in the passive setting.

In some example embodiments, the mobile device collaboration and radiation alleviation implemented by the first device 105, the second device 110, and/or the third device 115, may be determined and activated by a server, e.g., server 104. The server 104 may refer to one of multiple computers communicatively coupled to at least one of the first device 105, the second device 110, and the third device 115 through a communication network. Non-limiting examples of the communication network may include local area network (LAN), wide area network (WAN), internet, etc.

Further, the server 104 may be configured to facilitate mobile device collaboration among the first device 105 and at least one of the second device 110 and the third device 115 to implement radiation alleviation in accordance with any wireless network protocol, such as the Internet, a wireless network, a cellular network, a WAN, a LAN, a virtual private network (VPN), etc. For example, the server 104 may receive from the first device 105 a first communication that includes an amount of radiation emitted from the first device 105 and a first location of the first device 105; receive from the second device 110 a second communication that includes a second amount of radiation emitted from the second device 110 and a second location of the second device 110; and receive from the third device 115 a third communication that includes a third amount of radiation emitted from the third device 115 and a third location of the third device.

The server 104 may calculate the amount of radiation surrounding the first device 105 of the first user 102 based on each of the amount of radiation emitted from the first device 105, the second device 110, and the third device 115 and the relative locations of each of the devices 105, 110, and 115. In response to the server 104 determining that the calculated amount of radiation surrounding the first device 105 of the first user 102 is greater than or equal to a predetermined radiation threshold level stored on a memory of the server 104, the server 104 may instruct the pair of devices 110 and 115 to multiplex processing by alternating between communication modes of a normal radiation transmission mode and a low radiation transmission mode. The pair of devices 110 and 115 may alternate communication modes such that while the second device 110 is transmitting in a normal radiation transmission mode, the third device 115 is transmitting in a low radiation transmission mode. The total emitted radiation utilizing this multiplex processing at any point in time may be an average of the radiation emitted during the normal and low radiation transmission modes at the point in time. Alternatively, the pair of devices 110 and 115 may alternate communication modes such that both the second device 110 and the third device 115 are transmitting in a normal radiation transmission mode, then both the second device 110 and the third device 115 change to a low radiation transmission mode, or vice versa. Therefore, the total emitted radiation over a cycle of the normal and low radiation transmission modes may be an average of the radiation emitted over the cycle during the normal and low radiation transmission modes. The server 104 may further instruct the first device 105 to activate a change in communication mode from a normal radiation transmission mode to a low radiation transmission mode.

In some example embodiments, system 100 may also include a wireless communication base station 101. Wireless communication base station 101 may be configured to facilitate multiple wireless communication technologies. For example, wireless communication base station 101 may include antennae and electronic communications equipment, e.g., a radio mast, tower, etc., to create a cell in a cellular network. Further, wireless communication base station 101 may facilitate mobile device collaboration to implement radiation alleviation that utilizes multiple wireless communication technologies. Further still, the first device 105 may report a measured amount of radiation detected by the first device 105 to the base station 101 in response to the measured amount of radiation emitted from one or more of the second device 110 and the third device 115 is greater than or equal to the predetermined radiation threshold. In response to the measured amount of radiation emitted from one or more of the second device 110 and the third device 115 being greater than or equal to the predetermined radiation threshold, the first device 105 may transmit instructions to base station 101 to, in turn, instruct one or more of the second device 110 and the third device 115 to alleviate radiation levels at least with regard to first device 105.

Figure 2:
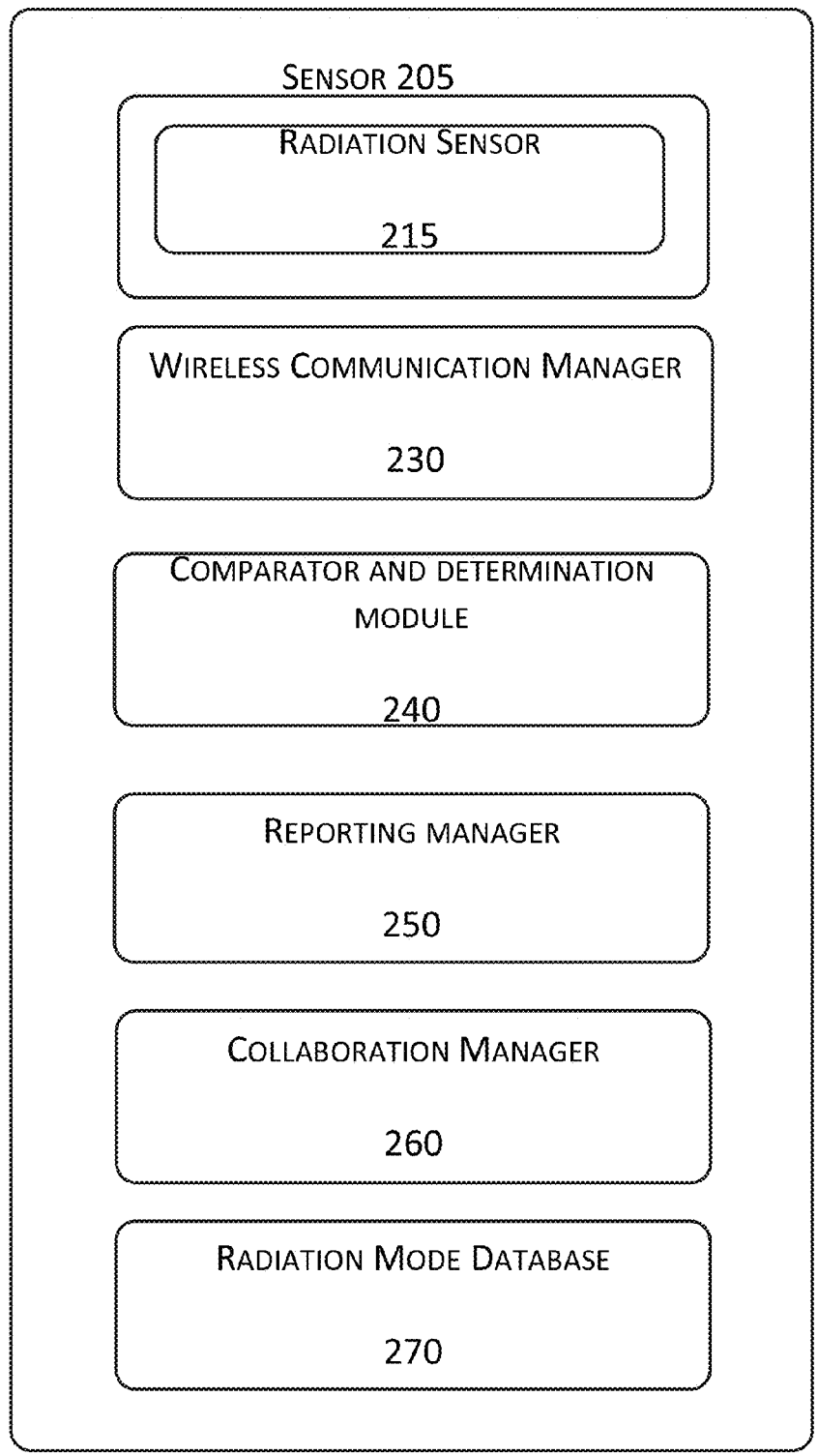
FIG. 2 shows an example configuration of a device that may implement at least portions of radiation alleviation, arranged in accordance with at least some embodiments described herein.

FIG. 2 shows an example configuration of a device 200 that may implement at least portions of the mobile device collaboration and radiation alleviation process, arranged in accordance with at least some embodiments described herein. The device 200 may refer to at least one of the first device 105, the second device 110, and the third device 115. As depicted, the device 200 may be configured to include a sensor 205, a wireless communication manager 230, a comparator and determination module 240, reporting manager 250, collaboration manager 260, and a radiation mode database 270. Further, the sensor 205 may include a radiation sensor 215.

In some example embodiments, the sensor 205 may record sensor information, e.g., radiation information, collected, detected, captured or otherwise received by the one or more components of the sensor 205. Any one or more of the sensor 205, the wireless communication manager 230, the comparator and determination module 240, the collaboration manager 260, and the radiation mode database 270, including the radiation sensor 215, may be implemented as hardware, software, firmware, or any combination thereof.

The radiation sensor 215 may refer to a component or module configured, designed, and/or programmed to detect radiation surrounding the device 200 and/or radiation emitted from another device, e.g., the second device 110 and the third device 115. For example, the radiation sensor 215 may pick up, detect or otherwise receive an amount of radiation from the second device 110 and/or the third device 115.

The wireless communication manager 230 may refer to a component or module configured, designed, and/or programmed to wirelessly communicate with one or more external communication devices. In some embodiments, the wireless communication module 230 may be implemented to communicate with one or more other devices in accordance with one or more protocols and/or technologies such as, for example, Bluetooth, RFID, Wi-Fi 33, infrared, NFC and one or more of the mobile communication standards (e.g., 3G, 4G, WiMax, CDMA, OFDM, LTE, LTE-A).

The comparator and determination module 240 may refer to a component or module configured, designed, and/or programmed to compare the measured and/or detected amount of radiation surrounding the first device 105 of the first user 102 to the predetermined radiation threshold during the predetermined period of time. In some embodiments, the comparator and determination module 240 may be implemented to calculate the amount of radiation surrounding the first device 105 of the first user 102 based on each of the amount of radiation emitted from the first device 105, the second device 110, and the third device 115 and the relative locations of each of the devices 105, 110, and 115. In some embodiments, comparator and determination module 240 may be implemented to determine an aggregate of the amount of radiation emitted from the first device 105 and the amount of emitted radiation as indicated in the communication received from at least one of the server 104, wireless base station 101, second device 110 and/or third device 115.

In some embodiments, the comparator and determination module 240 may be implemented to determine whether the amount of radiation surrounding the first device 105 of the user 102 is greater than or equal to the predetermined radiation threshold during the predetermined period of time. In some embodiments, comparator and determination module 240 may be implemented to determine whether the amount of radiation surrounding the first device 105 of the user 102 changes from being greater than or equal to the predetermined radiation threshold to less than the predetermined radiation threshold during the predetermined period of time. In both of these embodiments, the comparator and determination module 240 may be configured to instruct the reporting manager 250 to contact at least one of the server 104, wireless base station 101, first device 105, second device 110 and/or third device 115.

The reporting manager 250 may refer to a component or module configured, designed, and/or programmed to report a result received from the comparator and determination module 240. In some embodiments, the reporting manager 250 may contact at least one of the server 104, wireless base station 101, first device 105, second device 110 and/or third device 115 and report the measured amount of radiation surrounding the first device 105.

The collaboration manager 260 may refer to a component or module configured, designed, and/or programmed to implement the mobile device collaboration and radiation alleviation. In some embodiments, the collaboration manager 260 may be implemented to divide the number of mobile devices into pairs of devices. The collaboration manager 260 may be implemented to mode multiplex processing of OFDM and CDMA between each pair of mobile devices for radiation reduction. In some embodiments, the collaboration manager 260 may be implemented for the mode multiplex of OFDM and CDMA, by processing two transmitting signals by the first device 105 through different communication modes of OFDM and CDMA in each time frame.

In some embodiments, the collaboration manager 260 may be implemented for the mode multiplex of a low radiation transmission mode and a normal radiation transmission mode, by processing transmitting signals by alternating between the low radiation and normal radiation transmission mode of the first device 105 in each time frame.

The radiation mode database 270 may refer to a component or module configured, designed, and/or programmed to store one or more types of communication modes that are changeable as well as a number of radiation transmission modes to change to and from for each type of communication mode. Types of communication modes may include, for example, normal and low radiation transmission modes. The normal radiation transmission mode may include orthogonal frequency division multiplexed (OFDM) as a normal radiation transmission mode. The low radiation transmission mode may include Code Division Multiple Access (CDMA) as low radiation transmission mode. The OFDM transmission technique may include wireless communications such as LTE, LTE-A and WiMAX.

Figure 3:
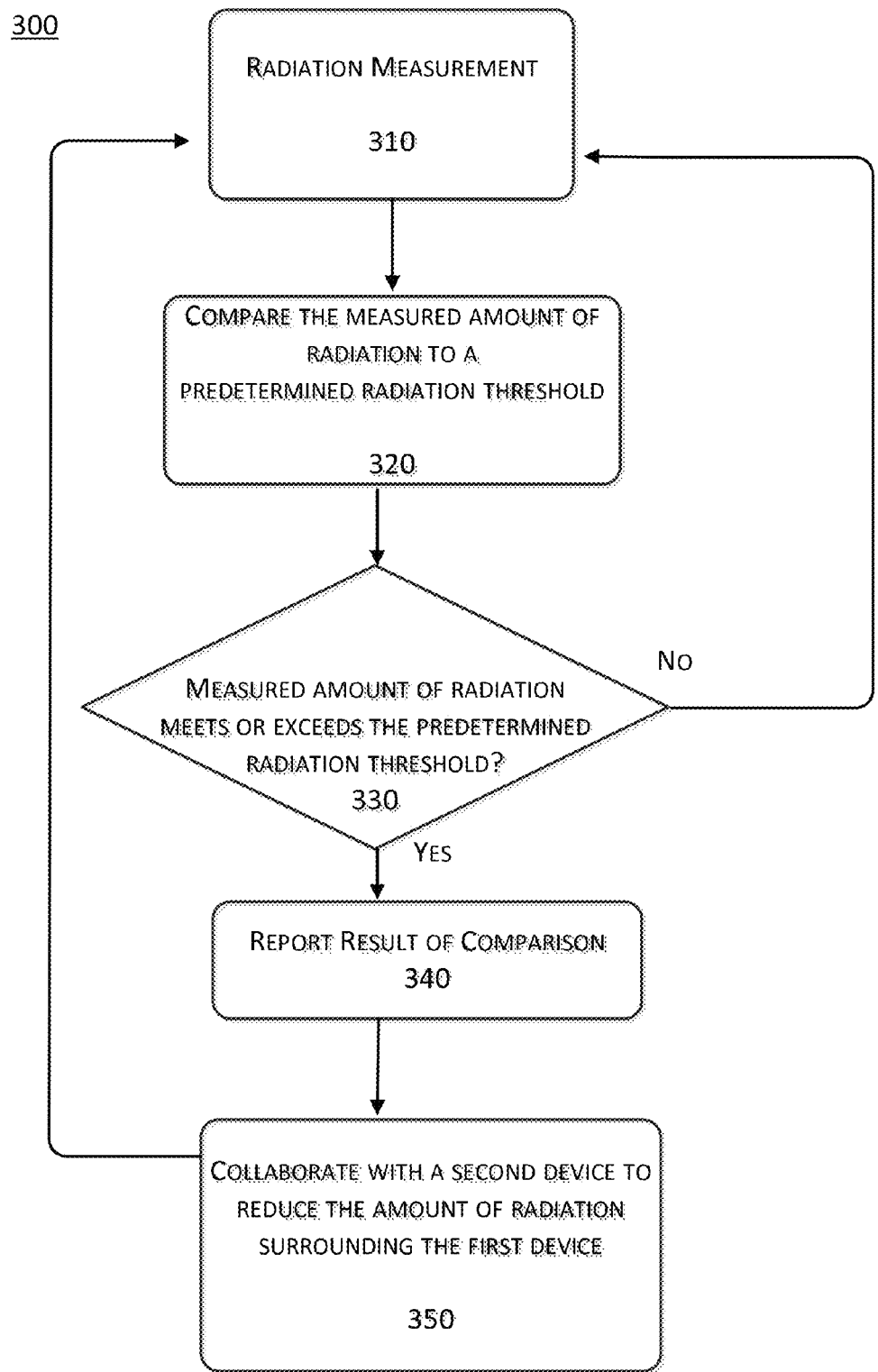
FIG. 3 shows an example processing flow by which radiation levels may be alleviated by collaboration between multiple devices, in accordance with at least some embodiments described herein.

FIG. 3 shows an example processing flow 300 by which the mobile device collaboration and radiation alleviation may be implemented, in accordance with at least some embodiments described herein. Processing flow 300 may be implemented by at least one of the first device 105, the second device 110, and the third device 115. Further, the processing flow 300 may include one or more operations, actions, or functions depicted by one or more blocks 310, 320, 330, 340, and 350. Although illustrated as discrete blocks, various blocks may be divided into additional blocks, combined into fewer blocks, or eliminated, depending on the desired implementation. The processing flow 300 may begin at block 310.

Block 310 may refer to the first device 105 measuring and/or detecting, directly or indirectly, an amount of radiation surrounding the first device 105 of the first user 102 during a predetermined period of time. In some embodiments, block 310 may refer to receiving indication of an amount of radiation emitted from the second device 110 and/or the third device 115. In some embodiments, block 310 may refer to receiving from the second device 110 and/or the third device 115 a communication, based on a short-range communication protocol that includes an indication of the amount of radiation emitted from the second device 110 and/or the third device 115, respectively. In some embodiments, block 310 may refer to the first device 105 receiving from the server 104, or the wireless base station 101, a communication, based on a short-range communication protocol or long-range communication protocol, that includes an indication of the amount of radiation emitted from the second device 110 and/or the third device 115. The receiving of radiation information of the second device 110 and/or the third device 115 by the first device 105 from the wireless base station 101 or the server 104 may be a result of the first device 105 requesting such information.

In some embodiments, block 310 may refer to the server 104 and/or the wireless base station 101 receiving, from the first device 105, a first communication that includes an amount of radiation emitted from the first device 105; from the second device 110, a second communication that includes an amount of radiation emitted from the second device 110; and from the third device 115, a third communication that includes an amount of radiation emitted from the third device 115. Block 310 may be followed by a comparison block 320.

Block 320 may refer to the first device 105 comparing the measured and/or detected amount of radiation surrounding the first device 105 of the first user 102 to the predetermined radiation threshold during a predetermined period of time. In some embodiments, block 320 may refer to comparing an aggregate of the amount of radiation emitted from the first device 105 and the amount of emitted radiation as indicated in the communication from the second device 110 and/or third device 115 while taking into account the distance between the each of the devices 105, 110, and 115. In some embodiments, block 320 may refer to comparing an aggregate of the amount of radiation emitted from the first device 105 and the amount of emitted radiation as indicated in the communication received from at least one of the server 104, the wireless base station 101, the from second device 110 and/or the third device 115.

Decision block 330 may refer to the first application 120A implemented on the first device 105 determining whether the amount of radiation surrounding the first device 105 of the user 102 is greater than or equal to the predetermined radiation threshold during the predetermined period of time. In some embodiments, decision block 330 may alternatively determine whether the amount of radiation surrounding the first device 105 of the user 102 changes from being greater than or equal to the predetermined radiation threshold to less than the predetermined radiation threshold during the predetermined period of time. Upon a negative determination (i.e., "NO" at decision block 330), decision block 330 may be followed by block 310; however, upon a positive determination (i.e., "YES" at decision block 320), decision block 330 may be followed by block 340.

Decision block 340 may refer to first application 120A corresponding to first device 105 implementing a reporting procedure. In some embodiments, block 340 may refer to the first device 105 reporting to the base station 101 that the amount of radiation is greater than or equal to the predetermined radiation threshold during the predetermined period of time. In some embodiments, block 340 may refer to the first device 105 reporting to the base station 101 that the amount of radiation changes from being greater than or equal to the predetermined radiation threshold to less than the predetermined radiation threshold during the predetermined period of time. The first device 105 may instruct the base station 101 to contact the second device 110 and/or the third device 115 to implement the mobile device collaboration and radiation alleviation 350 to reduce the amount of radiation surrounding the user 102 of the first device 105.

In some embodiments, block 340 may refer to the first device 105 reporting to the second device 110 and/or third device 115 that the amount of radiation is greater than or equal to the predetermined radiation threshold during the predetermined period of time. In some embodiments, CARP may include the first device 105 reporting to the second device 110 and/or third device 115 that the amount of radiation changes from being greater than or equal to the predetermined radiation threshold to less than the predetermined radiation threshold during the predetermined period of time. The first device 105 may instruct the second device 110 and/or third device 115 to implement the mobile device collaboration and radiation alleviation 350 to reduce the amount of radiation surrounding the user 102 of the first device 105.

Decision block 350 may refer to the first application 120A of the first device 105 implementing the mobile device collaboration and radiation alleviation. In some embodiments, the mobile device collaboration and radiation alleviation includes dividing the number of mobile devices pairs of devices. The mobile device collaboration and radiation alleviation may be implemented between each pair of devices as a mode multiplex processing for radiation reduction. For the mode multiplex processing of OFDM and CDMA, the processing of transmitting signals by the first device 105 may be through different communication modes of OFDM and CDMA in each time frame.

In some embodiments for the mode multiplex processing of a low power transmission mode and a normal radiation transmission mode, the processing of two transmitting signals may include alternating between the low power and normal radiation transmission mode of the first device 105 in each time frame.

Figure 4:
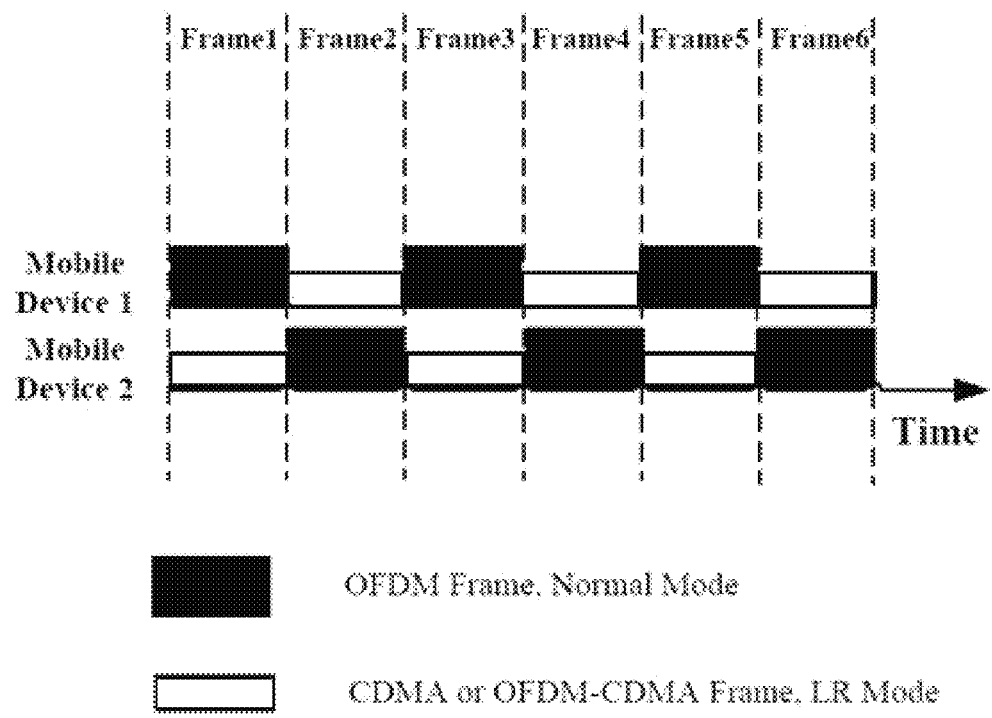
FIG. 4 shows an example of multiplex processing of two different transmitting signals with low and/or high radiation transmission communication modes in each time frame, in accordance with at least some embodiments described herein.

In accordance with FIG. 4, for a mode multiplexing processing of OFDM and CDMA with spreading factor V, the sum radiation to the human body may be reduced to $(V+1)/2V$. Furthermore, to offer a flexible tradeoff between radiation and transmission rate, an adaptive power control factor $\alpha$ may be multiplied by each transmit signal. Therefore, the sum radiation to the human body may be reduced to $\alpha(V+1)/2V$. In some embodiments, the mobile device collaboration and radiation alleviation may be performed for each pair of detected radiation producing mobile devices instead of multiple devices at once, which reduces the computational complexity and processing delay. Further, the mobile device collaboration and radiation alleviation may be implemented with current two-mode capable mobile devices.

Implementation of the mobile device collaboration and radiation alleviation by the first device 105 may return the communication mode from the low radiation transmission mode to the to the normal radiation transmission mode if the measured amount of radiation P(t) for the first device 105 is less than the predetermined threshold H1 during the predetermined period of time T1. Further the first device 105 may also inform adjacent radiation producers to switch to the normal radiation transmission mode.

FIG. 5 shows a block diagram illustrating an example computing device 400 by which various example solutions described herein may be implemented, arranged in accordance with at least some embodiments described herein.

In a very basic configuration, the computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor ($\mu$P), a microcontroller ($\mu$C), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. Application 522 may include a device power collaboration process (mobile device collaboration and radiation alleviation) 526 that is arranged to perform the functions as described herein including those described with respect to processing flow 300 of FIG. 3 (by, e.g., the first device 105, the second device 110, and/or the third device 115). Program data 524 may include mode data 528 that may be useful for operation with device power collaboration process (mobile device collaboration and radiation alleviation) 526 as described herein. In some embodiments, the application 522 may be arranged to operate with the program data 524 on the operating system 520 such that implementations of changing communication modes, e.g., the low and normal radiation transmission modes, may be provided as described herein. This described basic configuration 502 is illustrated in FIG. 5 by those components within the inner dashed line.

The computing device 500 may have additional features or functionality, and additional interfaces to facilitate communications between basic configuration and any required devices and interfaces. For example, the bus/interface controller 530 may be used to facilitate communications between the basic configuration 502 and one or more data storage devices 532 via a storage interface bus 534. The data storage devices 532 may be removable storage devices 436, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. The computing device 500 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Further, the use of the term "multiple" should be interpreted as "two or more."

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to reduce radiation that surrounds a first device, the method comprising:
measuring, at least once within a specific period of time, an amount of the radiation that surrounds the first device, wherein the first device is communicatively connected to a second device;
comparing the measured amount of the radiation to a specific radiation threshold; and
in response to the measured amount of the radiation being greater than or equal to the specific radiation threshold:
reporting, to the second device, the measured amount of the radiation, and
collaborating, by the first device, with the second device to reduce the measured amount of the radiation that surrounds the first device, wherein the collaborating comprises alternating, with the second device, between operating in a currently used communication protocol and operating in a secondary communication protocol in consecutive time frames over a subsequent specific period.

2. The method of claim 1, wherein the measured amount of the radiation corresponds to an amount of radiation that corresponds to signals received from the second device.

3. The method of claim 2, wherein the measured amount of the radiation is greater than or equal to the specific radiation threshold for a specific number of times during the specific period of time.

4. The method of claim 1, further comprising in response to the measured amount of the radiation being less than the specific radiation threshold, switching the first device to a first normal radiation mode.

5. The method of claim 4, further comprising in response to the measured amount of the radiation being less than the specific radiation threshold, instructing the second device to switch to a second normal radiation mode.

6. The method of claim 1, wherein the operating in the secondary communication protocol comprises emitting a lower amount of the radiation than when operating in the currently used communication protocol.

7. The method of claim 6, wherein:
the collaborating reduces the amount of the radiation by $(V+1)/2V$, and
V is a spreading factor that, when applied to the operation in the secondary communication protocol, produces similar transmission performance as the currently used communication protocol.

8. The method of claim 1, wherein the currently used communication protocol is orthogonal frequency division multiplexing (OFDM).

9. The method of claim 1, wherein the secondary communication protocol is Code Division Multiple Access (CDMA).

10. The method of claim 1, wherein the collaborating comprises multiplying a transmit signal by an adaptive radiation control factor to control a radiation amount of the transmit signal.

11. The method of claim 1, further comprising:
measuring, one or more times, the amount of the radiation that surrounds the first device during the collaborating;
comparing the amount of the radiation measured during the collaborating to the specific radiation threshold; and
in response to the amount of the radiation measured during the collaborating being less than the specific radiation threshold, instructing the second device to return to the currently used communication protocol.

12. A non-transitory computer-readable medium that stores executable instructions that, in response to being executed, cause a processor to perform operations to reduce radiation that surrounds a first device, the operations comprising:
    measuring an amount of the radiation, emitted from a plurality of devices, which surrounds the first device of the plurality of devices;
    comparing the measured amount of the radiation to a specific radiation threshold;
    in response to the measured amount of the radiation being greater than or equal to the specific radiation threshold:
        reporting, to the plurality of devices, the measured amount of the radiation, and
        dividing the plurality of devices into pairs of devices to respectively collaborate with each other to reduce the measured amount of the radiation that surrounds the first device; and
    in response to the measured amount of the radiation being less than the specific radiation threshold, switching the first device to a normal radiation mode.

13. The non-transitory computer-readable medium of claim 12, further in response to the measured amount of the radiation being greater than or equal to the specific radiation threshold, instructing a first pair and second pair of the pairs of devices to alternate between operating in a currently used communication protocol and operating in a secondary communication protocol in consecutive time frames over a subsequent specific period of time.

14. The non-transitory computer-readable medium of claim 12, further in response to the measured amount of the radiation being greater than or equal to the specific radiation threshold, instructing a second device and a third device of a first pair of the pairs of devices to alternate between a currently used communication protocol and a secondary communication protocol in consecutive time frames over a subsequent specific period of time.

15. An apparatus, comprising:
    a radiation sensor configured to measure an amount of radiation that surrounds a first device, wherein the first device is communicatively connected to a second device;
    a comparator, communicatively coupled to the radiation sensor, configured to compare the measured amount of the radiation to a specific radiation threshold;
    a wireless communication manager, communicatively coupled to the comparator, configured to report to the second device the measured amount of the radiation, in response to the measured amount of the radiation being greater than or equal to the specific radiation threshold; and
    a collaboration manager, communicatively coupled to the wireless communication manager, configured to collaborate with the second device to reduce the measured amount of the radiation that surrounds the first device, wherein to collaborate with the second device, the collaboration manager is configured to multiply a transmit signal by an adaptive radiation control factor to control a radiation amount of the transmit signal.

16. The apparatus of claim 15, wherein to collaborate with the second device, the collaboration manager is configured to alternate, with the second device, between operation in a currently used communication protocol and operation in a secondary communication protocol in consecutive time frames over a specific period of time.

17. The apparatus of claim 15, wherein the collaborating comprises alternating, with the second device, between operating in a currently used communication protocol and operating in a secondary communication protocol within a time frame over a specific period of time.

18. The apparatus of claim 15, wherein the collaboration manager is configured to switch the first device to a normal radiation mode, in response to the measured amount of the radiation being less than the specific radiation threshold.

19. A system, comprising:
    a first device communicatively connected to a second device, the first device configured to:
        measure, at least once within a specific period of time, an amount of radiation that surrounds the first device;
        compare the measured amount of the radiation to a specific radiation threshold; and
        in response to the measured amount of the radiation being greater than or equal to the specific radiation threshold:
            report, to the second device, the measured amount of the radiation, and
            collaborate, by the first device, with the second device to reduce the measured amount of the radiation that surrounds the first device, wherein to collaborate with the second device, the first device is configured to alternate, with the second device, between an operation in a currently used communication protocol and an operation in a secondary communication protocol in consecutive time frames over a subsequent specific period of time.

20. The system of claim 19, wherein the first device is configured to switch to a normal radiation mode, in response to the measured amount of the radiation being less than the specific radiation threshold.

* * * * *